Nov. 5, 1946. L. A. LOEB Re 22,809

DISHWASHING MACHINE

Original Filed June 4, 1941 7 Sheets-Sheet 1

Inventor

Lawrence A. Loeb

By Rockwell & Bartholow

Attorneys

Nov. 5, 1946. L. A. LOEB Re 22,809

DISHWASHING MACHINE

Original Filed June 4, 1941 7 Sheets-Sheet 2

Inventor

Lawrence A. Loeb

By Rockwell, Lucktoba

Attorneys

DISHWASHING MACHINE

Original Filed June 4, 1941 7 Sheets-Sheet 3

Inventor

Lawrence A. Loeb

By Rockwell & Berkolas

Attorneys

Nov. 5, 1946. L. A. LOEB Re 22,809

DISHWASHING MACHINE

Original Filed June 4, 1941 7 Sheets-Sheet 4

Inventor

Lawrence A. Loeb

By Rockwell & Brockolow

Attorneys

Nov. 5, 1946. L. A. LOEB Re 22,809

DISHWASHING MACHINE

Original Filed June 4, 1941 7 Sheets-Sheet 5

Inventor

Lawrence A. Loeb

By Rockwell & Barkhorn

Attorneys

Nov. 5, 1946. L. A. LOEB Re 22,809

DISHWASHING MACHINE

Original Filed June 4, 1941 7 Sheets-Sheet 6

Inventor

Lawrence A. Loeb

By Rockwell, Fortsolow

Attorneys

DISHWASHING MACHINE

Original Filed June 4, 1941 7 Sheets-Sheet 7

Inventor

Lawrence A. Loeb

By Goodwillie Berkstresser

Attorneys

Reissued Nov. 5, 1946 Re. 22,809

UNITED STATES PATENT OFFICE 22,809

DISHWASHING MACHINE

Lawrence A. Loeb, New Haven, Conn.

Original No. 2,342,742, dated February 29, 1944, Serial No. 396,534, June 4, 1941. Application for reissue April 17, 1944, Serial No. 531,361

13 Claims. (Cl. 134—140)

This invention relates to dishwashing machines, and while shown in connection with a device of this kind such as illustrated in my prior application, Serial No. 367,020, filed November 25, 1940, which has matured into Patent No. 2,395,747, granted Feb. 26,1946, it will be understood that the improvements are applicable to dishwashing machines in general.

As illustrated herein, the device is designed for use particularly as a household dishwashing machine adapted to be supported from the floor. Machines of this character have in the past been of relatively expensive construction, and the expense has been a factor in restricting their distribution. Moreover, the present machines have some disadvantages in that it is necessary to reach to the lower part of the tub or container to fill the dish rack with the soiled dishes to be cleaned, and as the dishes must usually be placed in this rack singly so that they are held in spaced relation for effective cleaning, the operation is somewhat tedious.

One object of the present invention is to provide a dishwashing machine with a dish-supporting rack which may be elevated from its normal position at the lower part of the tub or tank to an upper position where it may be loaded.

Another object of the invention is the provision of a dish-supporting rack which may be elevated and lowered in the tub by mechanical means such as an electric motor, and in the present instance use is made of the operating motor for this purpose.

To these and other ends the invention consists in the novel features and combinations of parts to be hereinafter described and claimed.

Figure 3:
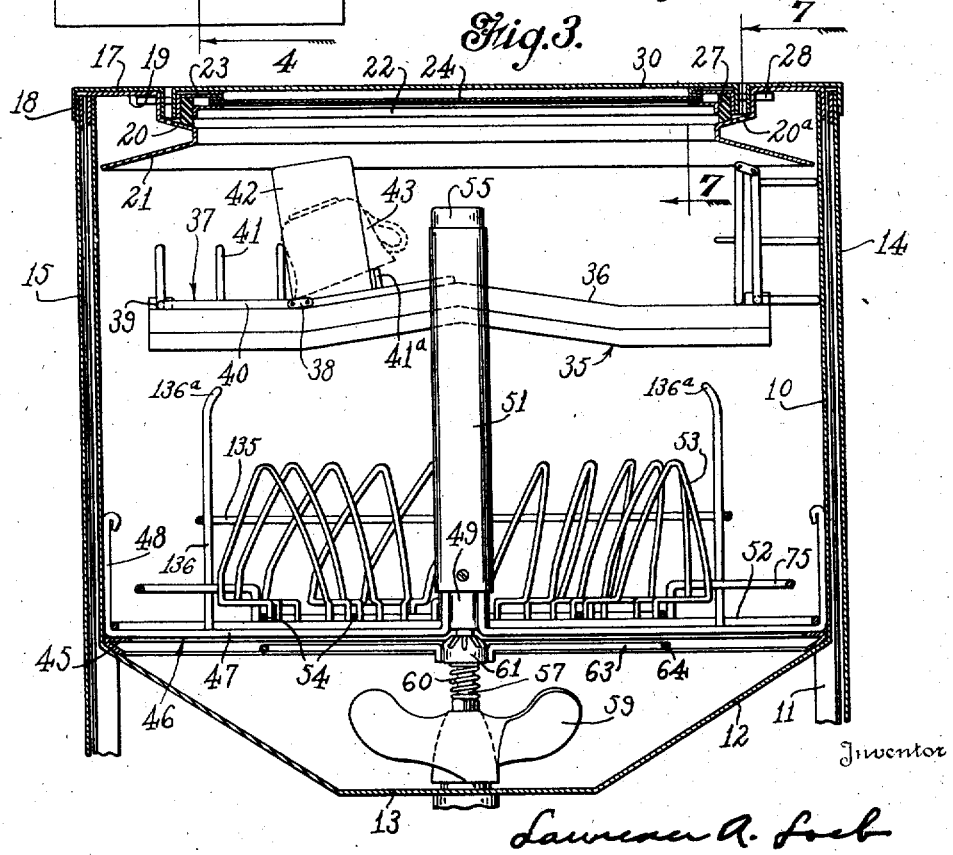
Fig. 3 is a sectional view on line 3—3 of Fig. 2.
Figure 4:
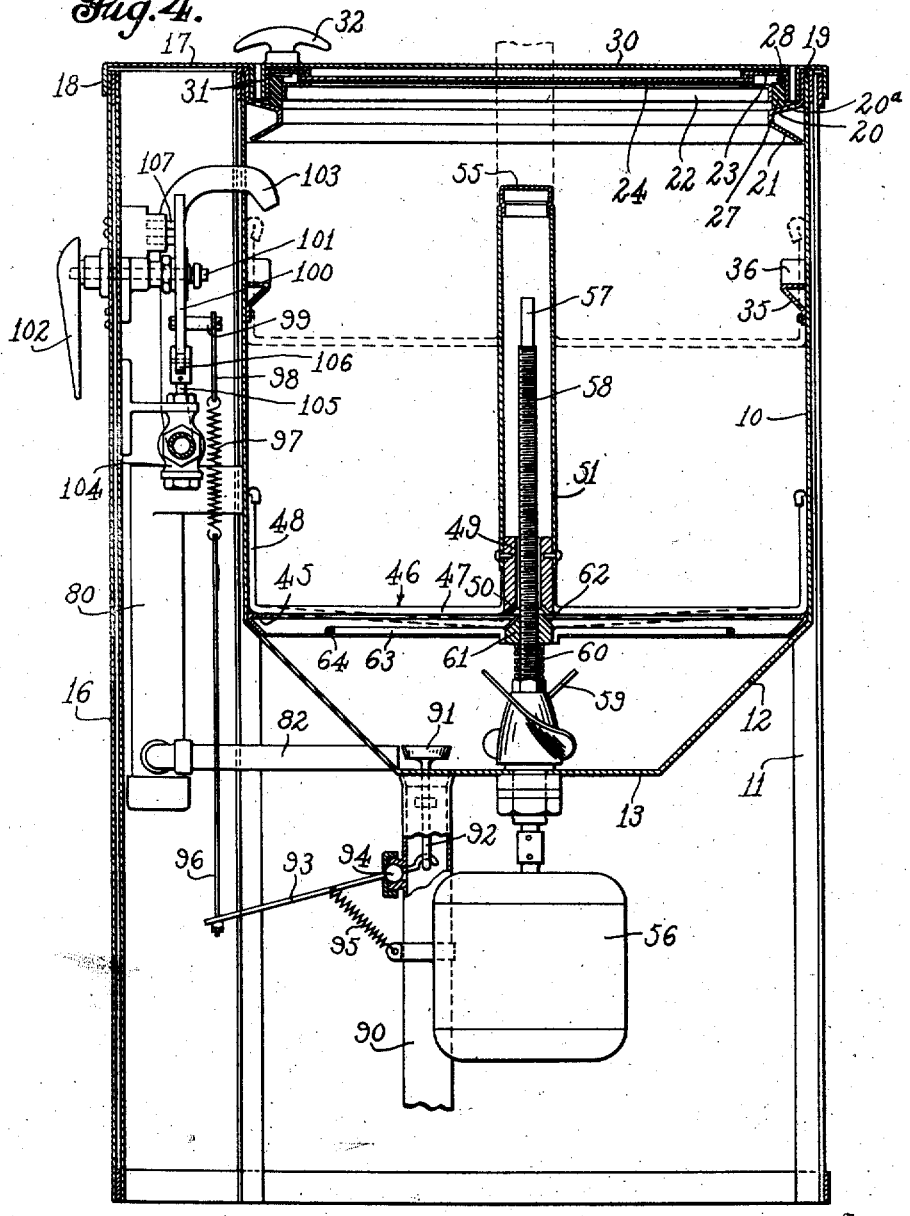
Fig. 4 is a sectional view on line 4—4 of Fig. 1.

As illustrated in the accompanying drawings, I have shown a dishwashing machine comprising a tub or tank 10 supported upon legs or standards 11, four of which are provided, one at each corner of the tank. At its lower portion the walls of the tank converge inwardly, as shown at 12, to the lower portion or bottom 13. It will be understood that the tank, which is thus firmly supported upon the legs 11, will be enclosed in an outer decorative case, the sides of which are indicated at 14 and 15 (Fig. 3) and the front indicated at 16 (Fig. 4).

Figure 1:
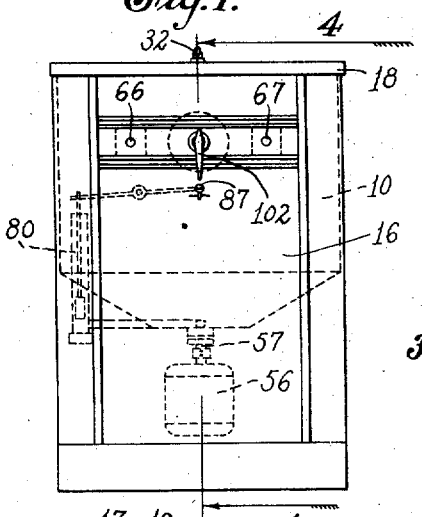
Fig. 1 is a front elevational view of a dishwashing machine embodying my improvements.
Figure 2:
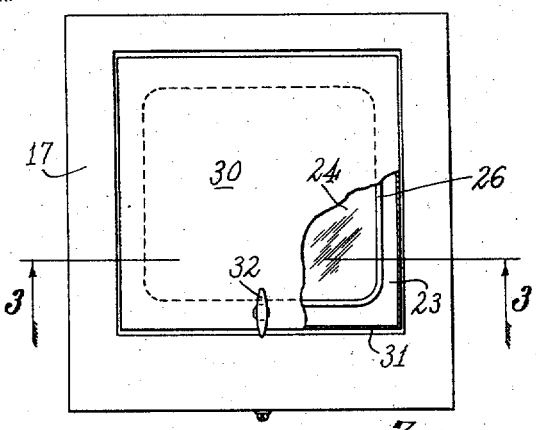
Fig. 2 is a top plan view of the same partly broken away for the sake of clearness.

The sides of the outer case may be placed in position and held in place by means of a top member 17 (Fig. 2) which is provided with downwardly projecting flanges 18 to overlap the upper edges of the parts of the casing and hold the latter in position. As shown in Fig. 2, the top member 17 is provided with a rectangular opening to receive the cover, as will be described hereinafter.

Telescoped over the upper edges of the container 10 and lying below the member 17 is a sheet metal member 19 of rectangular form, this member being provided with an inwardly extending flange 20 and an outwardly extending flange 21, which flanges will serve to direct the water downwardly which has been thrown up by the rotor and which, as is hereinafter described, will make a tight fit with the cover so that the water will not be thrown from the machine. Openings 20a allow the escape of steam from the tub around the cover.

Figure 5:
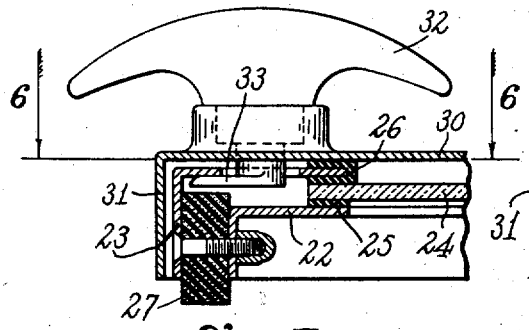
Fig. 5 is an enlarged view of the cover construction adjacent the handle.
Figure 6:
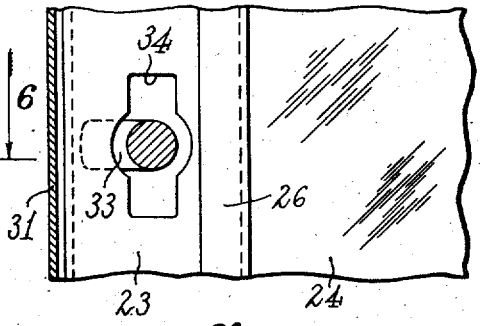
Fig. 6 is a sectional view on line 6—6 of Fig. 5.
Figure 7:
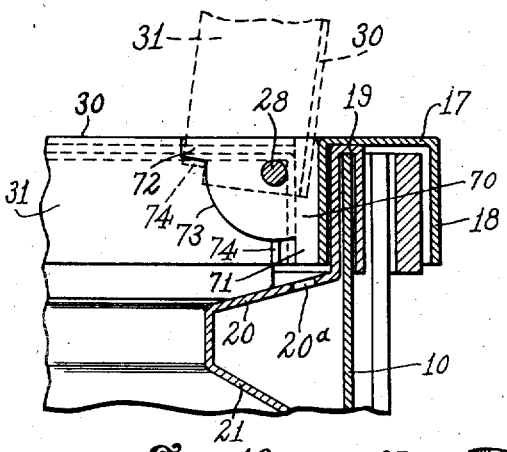
Fig. 7 is a sectional view on line 7—7 of Fig. 3 showing the hinge construction of the cover.

Within the opening of the top member 17 is a cover construction which will now be described. The cover is made in two parts, one of which comprises a pair of flanged or angle members 22 and 23 of rectangular form, between which members is clamped a piece of glass or other transparent material 24. Packing material of rubber or the like, as shown at 25 or 26, may be placed between the flange members and the glass, so as to secure the latter in place and also make a tight seal. Also between the depending portions of the angle members is a gasket 27 of sponge rubber or the like which extends entirely around the four sides of the cover and, as shown in Fig. 3, fits tightly against the flange 20 so as to make a water-tight joint. A rod 28 extends through openings in the member 19 and also through openings in the angle member 23 to hinge this cover to the member 19, so that the cover may be opened and closed. Above the cover just described is a second opaque cover 30 which is provided with downwardly depending flanges 31 upon both sides and the front, this flange being omitted, however, at the back, as shown in Fig. 7. The side flanges of this second cover are also perforated to receive the rod 28 so that this cover will likewise be hinged upon this rod. The outside cover 30 is provided with a rotatable handle 32, as shown in Figs. 5 and 6. Upon the lower end of the shank of this handle is provided a wing or cam 33, which is adapted to enter through a slot 34 of keyhole shape in the horizontal portion of the flange member 23 of the lower cover. From Figs. 5 and 6 it will be noted that when the handle 32 is in the position shown the member 33 will secure the two covers together so that both may be simultaneously lifted or swung about their hinges by an upward pull upon the handle. When, however, the handle 32 is turned through an angle of 90° the member 33 will no longer engage the flange 23, but will pass through the slot 34 and will, therefore, permit the raising of the upper opaque cover 30 while leaving the transparent cover in closed position. Anyone operating the machine and desiring to view its action may, by releasing the lower cover, raise the upper one and may view the action of the machine through the transparent member 24. Normally the handle 32 will be left in the position shown in Fig. 5, so that the two covers will be raised and lowered together, as is, of course, desirable when loading or unloading the machine.

Upon the front and rear walls of the tub are provided flange members 35 of the form shown in Figs. 3 and 4, these members having upper surfaces 36 designed to support the front and rear ends of the upper dish racks, designated generally by the numeral 37. These dish racks, as shown, are made in two sections, hinged together by the links 38 and pivoted to the members 35 at 39, so they may be folded downwardly upon the surfaces 36 in operative position, as shown at the left side of Fig. 3, or folded upwardly in an out-of-the-way position, as shown at the right-hand side of this figure. These racks comprise lower grid members 40 from which project upwardly U-shaped bars or rods 41, the latter being in spaced relation so that relatively small dishes such as saucers and the like may be supported therebetween. The inner of the two sections of each of these racks is provided with a U-shaped member 41a of less height than the member 41. As shown in Fig. 3, for example, a glass 42 may rest flatly upon the bottom of the rack, while a cup, as shown at 43, is supported in an inclined position, as the edge of the cup rests upon the upper surface of the member 41a.

Figure 8:
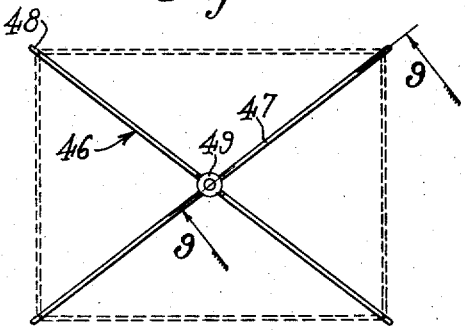
Fig. 8 is a plan view of the supporting member or grid upon which the dish rack rests.
Figure 9:
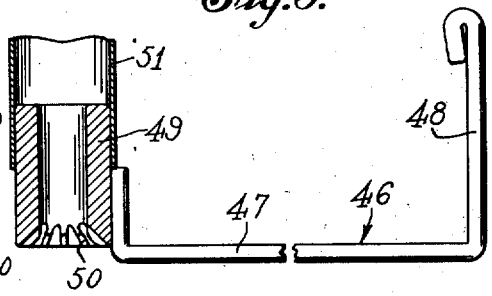
Fig. 9 is an enlarged sectional view on line 9—9 of Fig. 8.

Adjacent the lower part of the tub is a flanged member 45 of rectangular shape secured to the tub walls so as to form a support for a supporting grid for the lower dish rack, this grid being shown in Fig. 8 and designated generally by the numeral 46. This grid comprises four arms 47 which extend diagonally from the center of the tub toward the four corners, at which the arms are provided with upwardly extending ends 48 which serve to guide the grid in its movements upwardly and downwardly in the tub, as will be hereinafter explained. The inner ends of the arms 47 are secured, as by welding or the like, to a sleeve 49 provided with clutch teeth 50 at its lower end, the lower end also being beveled or tapered outwardly so as to be generally of frusto-conical shape. Also secured to the sleeve 49 is a tubular shield 51 which extends upwardly from the sleeve to a point adjacent the upper dish rack, as shown in Fig. 3.

Resting upon the grid 46 is a lower dish rack which comprises a grid or wire network 52 to which are secured upstanding dish-supporting members 53, as shown more especially in Fig. 3, the latter members being secured at their lower ends to spaced circular rods 54, which are in turn secured to the grid 52. It will be apparent that the ends of the members 47 are supported upon the ledges or flanges 45 at their outer ends only, and these members are resilient so that the inner portions thereof about the sleeve 49 may be sprung downwardly to some extent for a purpose to be explained hereinafter. The tubular member 51 is closed at the top by a cap 55, as shown in Fig. 4.

It will be apparent that as the lower dish rack is supported upon the grid 46, which is in turn supported freely upon the ledge 45, the raising of this grid will effect the raising of the lower dish rack, which raising motion is accomplished by the mechanism which will now be described. Supported below the tub 10 in any suitable manner is a reversible motor 56, the shaft or shaft extension 57 of which extends upwardly through the bottom 13 of the tub and is threaded, as shown at 58, the shaft extending through the sleeve 49 and to a point adjacent the upper end of the tube 51. Upon this shaft is secured the agitator 59 which will serve to agitate the water in the tube to cleanse the dishes.

Above the agitator 59 a compression spring 60 loosely surrounds the shaft, the spring being compressed between the upper portion of the hub of the agitator 59 and a clutch nut 61 threaded upon the shaft 57, so that when the shaft 57 is rotated and the nut held against rotation, the nut will travel longitudinally of the shaft. The upper surface of the nut is tapered so as to be of frusto-conical shape complementary to the lower end of the sleeve 49, and is provided with complementary teeth 62 to engage those at the lower surface of the sleeve. Also secured to the nut 61 are spokes 63 extending outwardly to a ring 64 disposed in a horizontal plane below the grid 46.

It will be apparent that when the nut 61 and attached ring 64 travel longitudinally of the shaft 57, the grid 47 and lower dish rack 52 will be carried therewith, the dish rack being raised and lowered in the tub 10 depending upon the direction of rotation of the shaft 57 by the reversible motor 56. The grid or spider 46 will be guided in these movements by the upstanding members 48 arranged at each corner of the tub, which is rectangular in horizontal cross-section.

The parts are so arranged that when the motor 56 rotates in a direction to turn the agitator in the proper direction for a washing operation, the nut 61 will be moved downwardly on the shaft 57, and when the motor shaft is rotated in the opposite direction the nut will move upwardly so as to raise the dish rack from the full to the dotted line positions shown in Fig. 4. Push buttons 66 and 67 may be provided on the front of the machine to operate the motor in the proper direction to raise and lower the rack respectively. When the push button 66 is pressed inwardly, the motor 56 will operate in a clockwise direction, which will cause the nut 61 to ascend the threaded shaft 57 and carry the dish rack with it. When the nut 61 reaches the upper ends of the threads 58 (these threads terminating below the upper end of the shaft, as shown in Fig. 4), the upward movement of the dish rack will be stopped. The operator at this time will release the pressure upon the push button 66, as the dish rack will be raised to its fullest extent, where it may be conveniently loaded with dishes. If pressure upon the button 66 is not immediately released, however, no harm will result, as the nut 61 will merely vibrate slightly upon the upper end of the threaded portion 58 of the shaft 57. When it is desired to lower the dish rack the button 67 will be pressed, thus rotating the motor in a counterclockwise direction. The weight of the dish rack and dishes upon the nut 61 will cause it to be engaged with the threads 58, whereupon the nut, grid and dish rack will be carried downwardly upon the shaft 57 until the grid contacts the shelf or ledge 45. The downward movement of the grid and dish rack will be arrested at this point. The nut 61 may, however, continue to travel downwardly until its lower surface is engaged by the compression spring 60. When a slight pressure upon the nut is exerted by this spring, the downward travel of the nut will be arrested, and it will merely rotate with the shaft 57, which action occurs during the operation of the machine, as the rotor and shaft 57 are continuously rotated when the washing operation is in progress.

It will be noted that in the position just described, and which is shown in Fig. 4, the nut 57 is in its lowermost position and the clutch teeth on the upper surface thereof are disengaged from those at the lower end of the sleeve 49. If in this position the button 66 is pressed, the nut would tend to rotate with the shaft, and hence would not be elevated. The operator may, however, by a slight downward pressure upon the cap 55 of the tube 51, spring the arms 47 downwardly slightly at the center of the tub, and as shown by dotted lines in Fig. 4, so as to engage the clutch teeth of the nut 61 with those of the sleeve 49. This will immediately stop the rotation of the nut and cause it, together with the grid and dish rack, to begin their upward travel. This pressure, once the clutch faces are engaged, may be immediately released.

Upon the hinge rod 28 is mounted an angle-shaped plate 70 having extended ends 71 and 72 joined by an arc-shaped surface 73, and a lip 74 is turned outwardly from the flange 31 of the cover 30 to engage one side of extensions 71 and 72, the lip riding along the arc-shaped surface 73 when the cover is swung from closed to open position. The rear edge of the member 70 rests against the downwardly extending flange of the portion 17, so that the plate will be held against movement. It will thus be seen that the movement of the cover 30 is limited by the engagement of the member 74 with the end portions 71 and 72, so that the cover may be held in raised or open position, as shown in dotted lines in Fig. 7.

Figure 12:
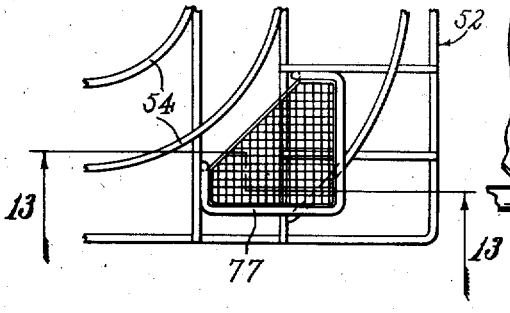
Fig. 12 is a plan view of a corner portion of the lower dish rack.
Figure 13:
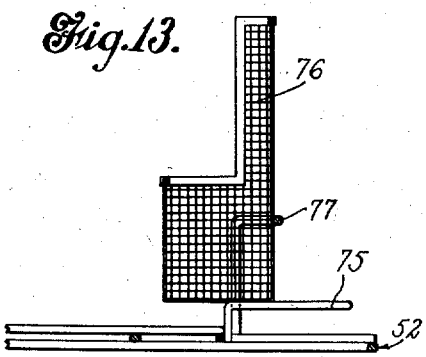
Fig. 13 is a partial sectional view on line 13—13 of Fig. 12.

The lower dish rack 52 is provided with an upwardly spaced ring 75 to receive large pieces such as platters or the like, and upon this ring may be seated a basket 76 for silverware or small pieces, as shown in Figs. 12 and 13. The basket is held in position by a wire frame 77 secured to the lower rack and bent in proper shape to partially surround the basket, as shown.

Figure 10:
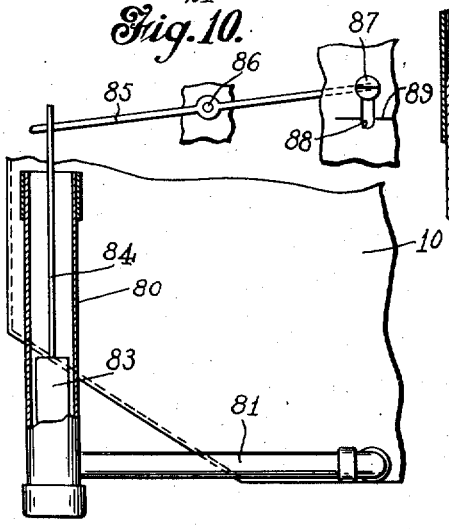
Fig. 10 is a detail view showing the water-level indicating means.

A float chamber 80 is provided adjacent one corner of the tub between the latter and the front portion of the casing, and from this float chamber a pipe 81 extends horizontally along the casing to a point adjacent the center thereof, where it is provided with an inwardly extending end 82 (Fig. 4) which projects into the tub, so that the interior of the float chamber is in communication with the water in the tub. Within the chamber 80 is provided a float 83 (Fig. 10) which is connected by a stem 84 to one end of a lever 85 pivoted between its ends, as shown at 86, on a part of the casing. The other end of this lever carries a float-level indicator 87, which projects outwardly through a slot 88 in the casing to be visible to the operator, the indicator cooperating with a mark 89 on the casing to indicate when the tub has been filled to the proper level.

At the lower portion of the tub is a drain tube 90, the mouth of which is controlled by the valve 91 mounted on a stem 92, which may be raised and lowered by the lever 93 pivoted at 94. A spring 95 normally urges the lever downwardly to raise the valve 91 to open position. The outer end of the lever 93 is connected to a link 96, which is in turn connected by a spring 97 to a link 98 pivoted at 99 to a control disk 100. The control disk is substantially the same as shown in my prior application, Serial No. 367,020, filed November 25, 1940, above referred to, and is carried by a shaft 101 rotatably mounted at the front of the casing and rotated by a control handle 102.

To admit water or other cleaning fluid into the tub, an inlet 103 is provided, as shown in Fig. 4. The discharge end of this pipe, as will be seen from this figure, is directed toward the blades of the rotor 50, so that the fresh water will be directed toward these blades and will be thrown by them upwardly against the dishes. The pipe 103 is controlled by a valve within the casing 104, the valve being provided with a stem 105 carrying a roller 106 engaging the edge of the control disk 100. As described in my previous application, the control disk is of somewhat oval or oblong shape, so that when in the position shown in Fig. 11, or when turned 180° from that position, the valve stem 105 will be in an upward position and the valve closed. When, however, the disk 100 stands at 90° or 270° from the position shown in Fig. 11, the valve stem 105 will be pressed downwardly and water will be permitted to enter the tub.

Figure 11:
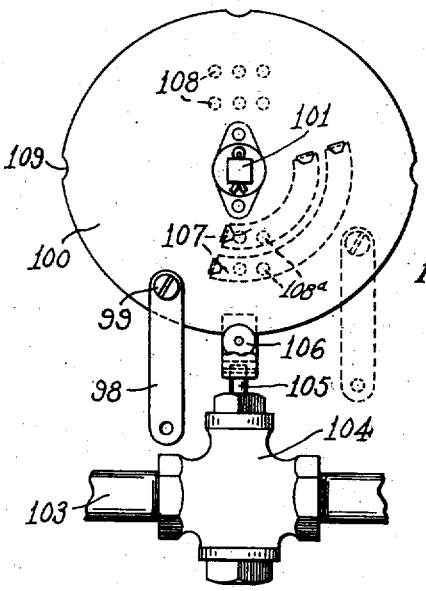
Fig. 11 is a view showing the control member for the motor, water supply, and drain.

The control disk is also provided with electrical contacts 107 designed to complete electrical circuits through the six contacts 108 to complete the circuit to the reversible motor to operate it in the proper direction for the cleansing operation. It will thus be seen that the control disk 100 not only controls the drain valve but also controls the inlet valve and the operating motor, effecting the operation of the motor in a direction to wash the dishes, but not in the reverse direction, which serves to raise the lower dish rack. It will also be apparent from Fig. 11 that the disk 100 is provided with recesses 109 designed to engage the roller 106 so as to provide definite stop positions for the disk. The recess which is engaged with the roller 106, shown in Fig. 11, is somewhat deeper than the remaining recesses, so as to provide a definite stop for the position of the parts when the drain valve is open, the inlet closed, and the motor at rest. This will, of course, be the position of the parts when the machine is not in use.

Figure 25:
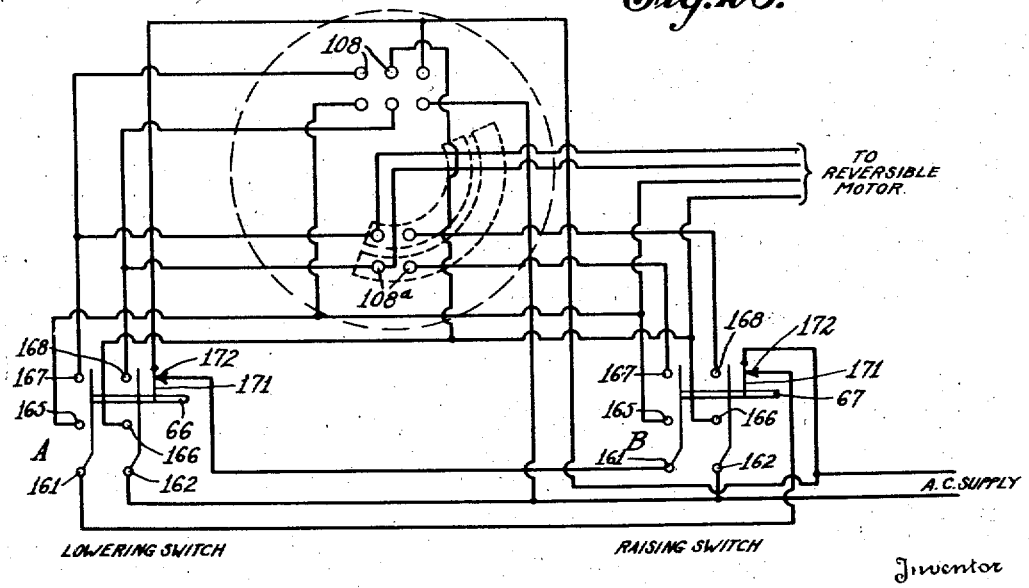
Fig. 25 is a wiring diagram showing the electrical connections between the various switches and the motor.

Also mounted adjacent the control disk 100 are four contact posts 108ª, which posts are connected by the contact strips 107 when the disk is in the "off" position, as shown in Fig. 11, which, as will be obvious from the wiring diagram of Fig. 25, completes the circuit to the motor from the switches controlled by the buttons 66 and 67. When the disk is turned to motor-operating position wherein the contacts 108 are connected by strips 107, the contact posts 108ª are no longer electrically connected, and the current through the raising switch operated by button 67 is broken.

As also shown in Fig. 11, the link 98 is connected to the disk 100 at a point closer to one of the recesses 109 than an adjacent one. As shown in full lines in this figure, which is the drain position, the link will occupy its lowermost position and the drain valve will be completely open. The dotted line position of the link 98 shown in this figure corresponds to the rinse position, in which water will be admitted to the tub but will also be draining therefrom, the dishes being rinsed mainly with clear water. In this position the drain valve will not be open to its full extent, as the link 98 will be in a somewhat higher position than that shown in full lines. It will be understood that the spring 97 will provide for movement of the control disk and the link 98 after the valve 91 may have been closed, so that even though the valve 91 is closed before the link 98 reaches its uppermost position, the control disk will still be permitted to rotate.

Figure 14:
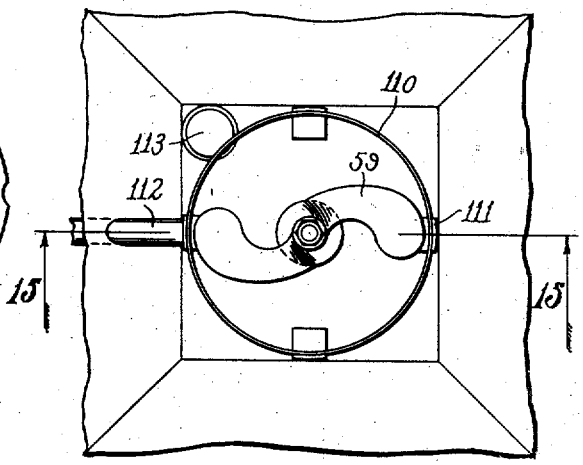
Fig. 14 is a plan view of the lower portion of a machine of modified construction.
Figure 15:
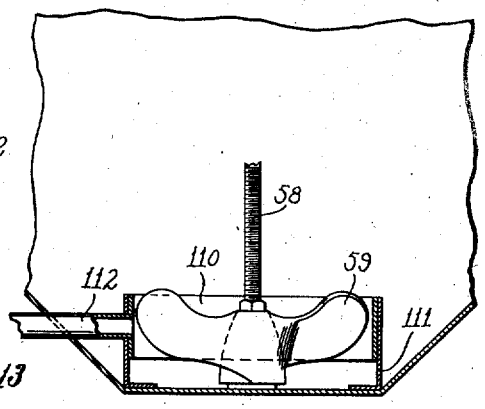
Fig. 15 is a sectional view on line 15—15 of Fig. 14.

In Figs. 14 and 15 of the drawings I have shown a somewhat modified form of my invention in which the rotor 59 is surrounded by a ring 110 supported from the bottom of the tub upon spaced standards 111, and at 112 is shown the inlet pipe leading into the ring 110 so that the fresh water admitted to the tub will be carried directly into the path of the rotor blades. In this instance the drain pipe is shown at 113.

Figure 16:
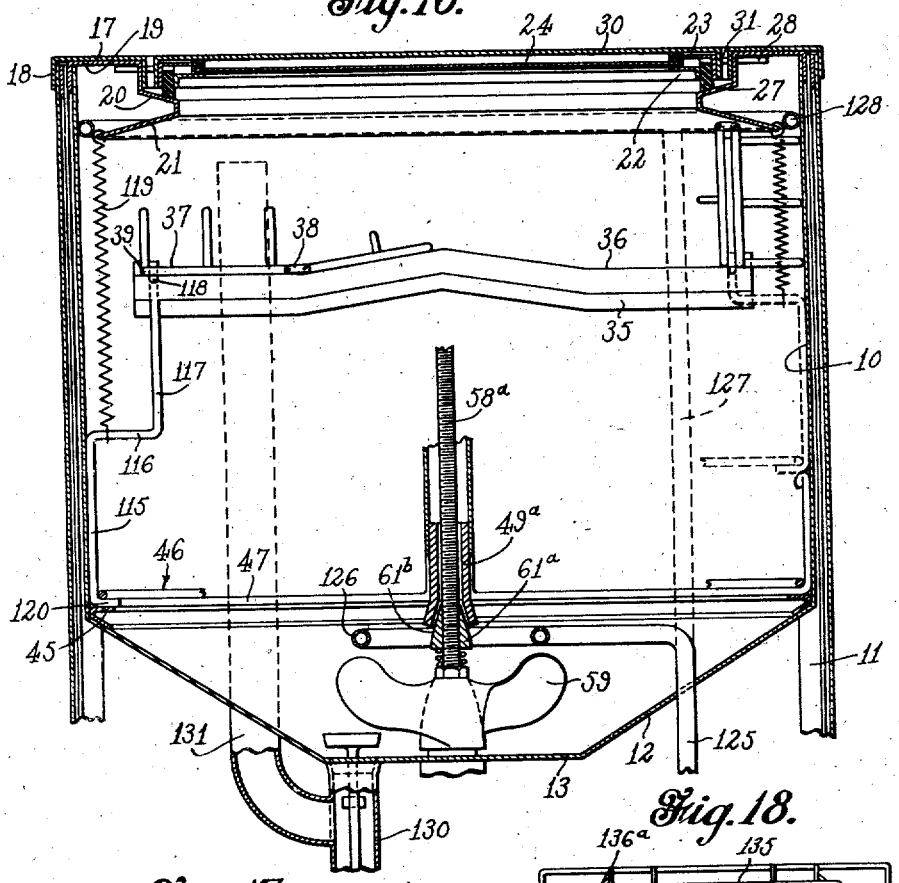
Fig. 16 is a sectional view similar to Fig. 3 showing a further modification.
Figure 17:
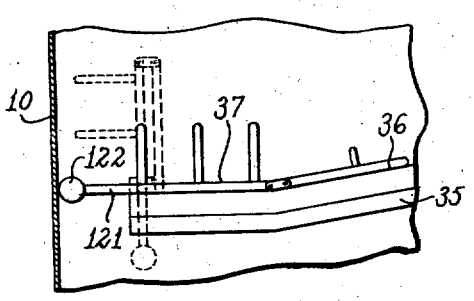
Fig. 17 is a detail view of the upper dish rack of a further modified form.

It will be observed that in the form of my invention shown in Figs. 1 to 13, it is necessary to fold the upper dish racks, as shown at the right-hand side of Fig. 3, before raising the lower dish rack to its upper position. In Figs. 16 and 17 of the drawings I have shown modifications of my invention wherein this folding of the upper dish rack is accomplished automatically. In the form of my invention shown in Fig. 16 the upper dish rack 37 is of the same construction as previously illustrated. Adjacent the sides of the tank are provided elevating rods 115, having inwardly offset portions 116 and upper ends 117 joined by a horizontal member 118 which engages the lower surface of the outer portion of the dish rack 37. A tension spring 119 is secured to the flange 21 and secured at its lower end to the portion 116 of the elevating rod. The lower end of the elevating rod is turned inwardly, as shown at 120, and lies below the grid 46. With this construction it will be apparent that when the grid 46 is moved upwardly the spring 119 effects the upward movement of the elevating members and causes the horizontal portion 118 to move the upper rack 37 upwardly from its extended position, as shown at the left of Fig. 16, to its folded position, as shown at the right of Fig. 16. When the grid 46 is moved downwardly to lower the dish rack the elevating members will likewise be lowered, thus leaving the portions of the upper dish rack free to be moved to their extended positions.

In Fig. 17 the outer portions of the dish rack 37 are provided with extended ends 121, which are weighted as shown at 122. In this form of the invention, when the dishes are removed from the dish rack 37 the latter will be caused to assume the folded position shown in dotted lines in Fig. 17 by reason of the weight 122, and will stand in this position until they have been moved downwardly by the operator and enough dishes placed thereon so that the weight of the dishes in the rack will not be overbalanced by the weight 122.

Also in Fig. 16 of the drawings I have shown nut 61ª, which is similar to the nut 61 except that it is provided with a long, tapered surface 61ᵇ adapted to engage within a similar surface at the lower end of the sleeve 49ª secured to the grid. In this case the clutch teeth on the sleeve and nut have been omitted, and dependence is placed upon the friction of the long tapered surfaces of the two parts to prevent rotation of the nut and cause its travel along the shaft 58ª.

Also in this figure of the drawings the inlet pipe 125 is divided, a part thereof having openings 126 adjacent the rotor and another branch 127 extending to the upper portion of the machine and having openings 128 adjacent the top thereof to discharge the cleansing fluid upon the dishes in the racks. Also, as shown in Fig. 16, the outlet pipe 130 is provided with a branch 131 extending upwardly so that when the water has been drained from the machine, fresh air will be drawn therein through the pipe 131 and drain pipe 130. It will be understood that the upper end of pipe 131 is open to the atmosphere for this purpose.

Figure 18:
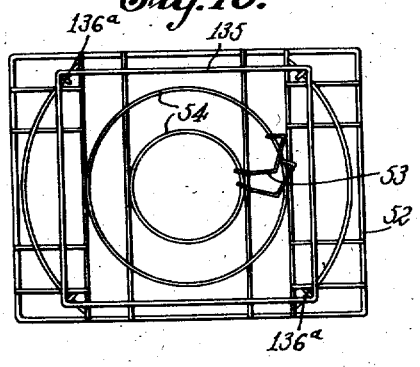
Fig. 18 is a top plan view of the lower dish rack.

As shown more particularly in Figs. 3 and 18, the lower dish rack is provided with a guard rail 135 of rectangular form, the guard rail being spaced upwardly from the base of the dish rack by means of upstanding legs 136. This guard confines the edges of the dishes stacked between the members 53 so that when the dish rack is raised the edges of these dishes will not strike against the flanges 21, but will rise through the openings between these flanges.

Figure 19:
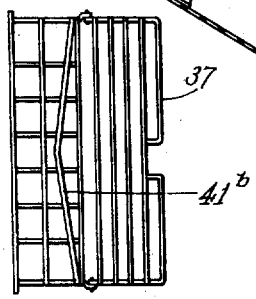
Fig. 19 is a top plan view of one of the upper dish racks.

As shown in Fig. 19, the outer one of the upstanding members 41ᵇ on this rack may be made V-shaped in top plan view, the angle of the V opening toward the central axis of the tub so that dishes stacked against this rack will be disposed in a position to conform to the spray of water or cleaning fluid delivered by the propeller or rotor 59.

Figure 20:
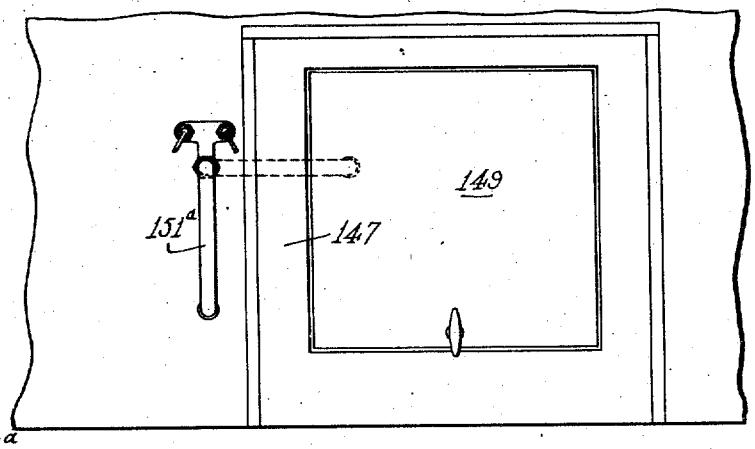
Fig. 20 is a top plan view of my dishwashing machine installed flush with a counter or drain board in the manner of the ordinary sink.
Figure 21:
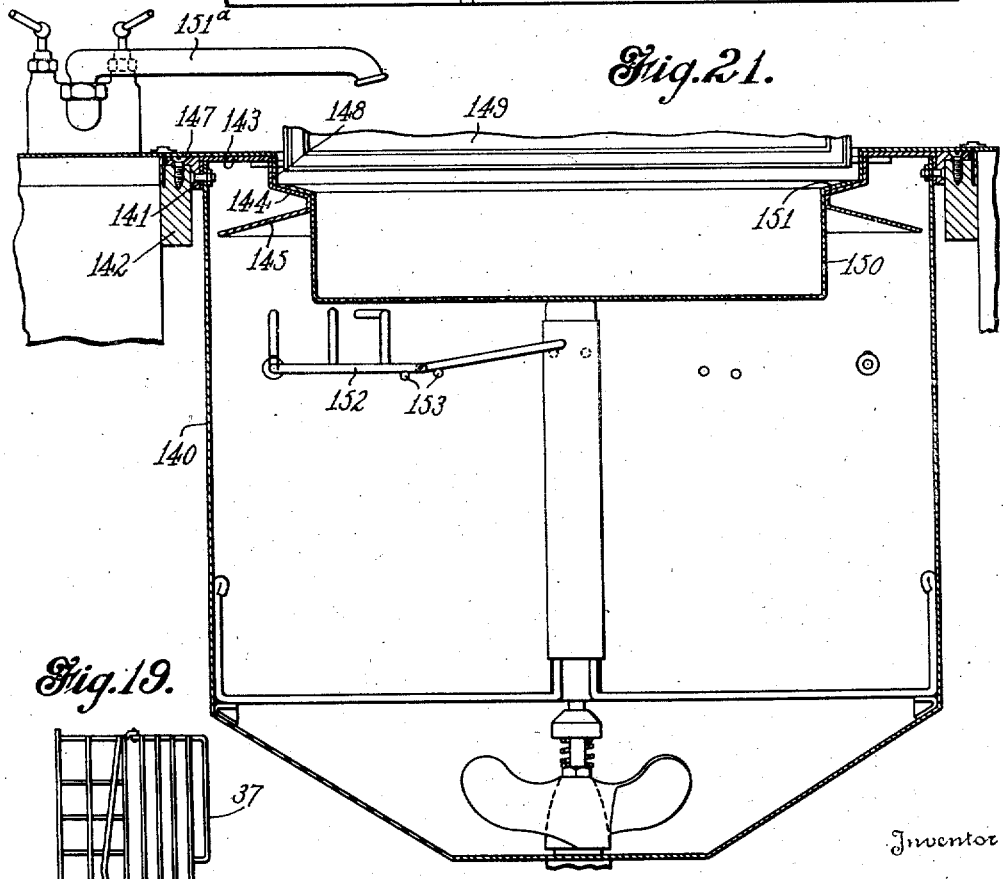
Fig. 21 is a sectional view of the device shown in Fig. 20.

In Figs. 20 and 21 of the drawings I have shown my dish-washing apparatus mounted in a drain board or counter in a manner similar to the ordinary sink, and if desired the device may take the place of the sink. To this end the tub or container 140 is secured to angle plates 141 which are in turn secured to the drain board 142. On the upper end of the tub is positioned a member 143 having a rectangular opening therein, about which opening are provided inwardly directed flanges 144 and outwardly directed flanges 145 similar to those shown in the modifications of my device heretofore described. A cover sheet 147, also having a rectangular opening therein, is placed over the member 143 to conceal the same and furnish an ornamental top portion for the device. The opening in the member 147 is defined by the downwardly depending flange 148, within which flange fits a hinged cover 149 to close the device.

If it is desired to use the tub of the washer as a sink, a strainer 150 may be inserted in the upper opening of the tub, the strainer being provided with outwardly directed flanges 151 which rest upon and support the strainer from the flanges 144. This strainer will, of course, be readily removable and replaceable so that it may be removed when it is desired to use the latter as a sink. A swinging faucet 151a may be arranged to swing out over the mouth of the tub 140 so that, particularly when it is used as a sink, hot or cold water may be delivered directly thereto. The upper racks 152 are of substantially the same form as the racks 37 previously described. Instead, however, of supporting these racks upon flanges, as shown in Figs. 3 and 16, short projecting pins 153 are secured in the sides of the tub 140, and extend inwardly to a sufficient extent to catch the side members of the racks and support the latter in the proper position.

Figure 22:
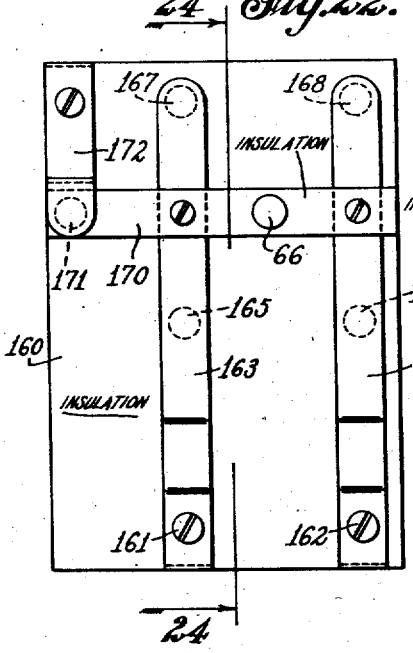
Fig. 22 is a front elevational view of one of the push button switches employed to raise or lower the lower dish rack.
Figure 23:
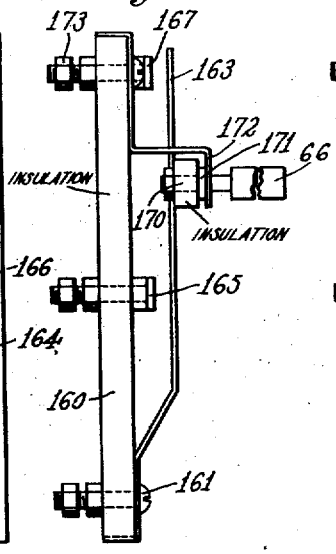
Fig. 23 is a side elevational view of the switch mechanism.
Figure 24:
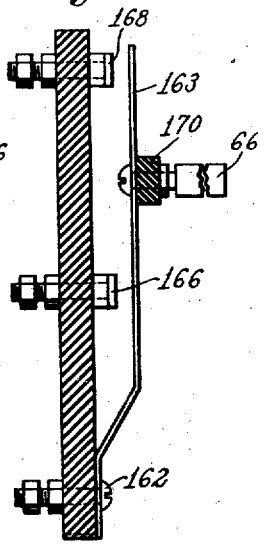
Fig. 24 is a sectional view on line 24—24 of Fig. 22.

In Figs. 22 to 24 of the drawings I have shown the switches used for raising and lowering the lower dish rack, and the wiring connections between these switches and the motor, and in addition between the control disk 100 and the motor. As shown in Figs. 22 to 24, the switch comprises a supporting plate 160 of insulating material, this plate having binding posts 161 and 162 to which are electrically connected spring contacts 163 and 164. Below these contacts and adapted to be engaged by the contacts when the latter are depressed are binding posts 165 and 166 adjacent the intermediate part of the plate, and binding posts 167 and 168 adjacent the upper part of the plate. It will be apparent that when the button 66 is depressed the spring contact 163 will engage the posts 165 and 167, and likewise the contact 164 will engage the posts 166 and 168, thereby connecting these posts in pairs respectively to the posts 161 and 162.

The button 66 is mounted upon an insulating strip 170 which extends across and is connected to the contact members 163 and 164, so that both of these are depressed evenly by pressure upon the button. The member 170 extends outwardly at one end and is provided on the extended end with a contact member 171 designed to engage a cooperating contact member 172 mounted upon the plate 160 and electrically connected to a binding post 173. The wiring of the device is so arranged that the current passing to one of the two switch members employed to raise and lower the dish rack must pass through the contacts 171 and 172, so that when one of the push buttons 66 or 67 is depressed the current will be broken to the switch of the other of these buttons. Therefore, if the operator presses the button 66, for example, to lower the dish rack, he cannot, while this button is depressed, close the circuit of the other switch by pressing the button 67, so that there will be no danger of causing a short circuit in this manner, or otherwise injuring the device.

The wiring diagram shown in Fig. 25 is believed to be clear without detailed description. The lowering switch controlled by the push button 66 is indicated at A and the raising switch controlled by button 67 is indicated at B, while the contacts mounted upon and controlled by the control disk are shown at the upper part of the figure, the control disk 100 being shown in dotted lines, the parts being given numbers corresponding to those used in Figs. 22 to 24, it being understood that the two switches A and B are of identical form.

It will be understood that it is desirable to arrange the dishes within the tub so as to obtain the best result of the spray delivered by the rotor or propeller. For example, the dishes in the lower rack should be arranged so that the upwardly directed spray is not interfered with to such an extent that it does not reach the articles in the upper rack. The transparent cover enables the operator to observe the action of the device when in operation, so as to see whether or not the dishes are stacked in the racks to the best advantage, and to change them if they are not so stacked. With a little practice one using the device is thus enabled to so stack the dishes that the best results are secured, and thus the transparent cover is a very important feature.

As shown in Figs. 3 and 18, the upstanding legs 136 may be continued above the guard rail 135, and slightly turned inwardly at their upper ends, as shown at 136a. Thus formed, the extended ends of these members form guides in the raising and lowering of the lower dish rack in that the inwardly turned ends 136a may contact the portion of the member 19 between the flanges 20 and 21, that is, the part of this member which defines the upper opening. In this way the lower rack, by the contacting of the upper ends of the members 136 with the member 19, will serve to properly guide the dish rack through the opening in the member 19 when it is raised to its upper position.

While I have shown and described some preferred embodiments of my invention, it will be understood that it is not to be limited to all of the details shown, but is capable of modification and variation within the spirit of the invention and within the scope of the appended claims.

What I claim is:

1. A dishwashing machine comprising a tub, a dish-supporting rack movably mounted in the tub, means for elevating said rack from a lower to a higher position in the tub, said means comprising a rotatable threaded shaft projecting upwardly into the tub, a nut threadedly engaged with said shaft and disposed below said rack to raise and lower the same upon rotation of said shaft, and means on said rack adapted to be non-rotatably engaged with the nut to prevent rotation of the latter with the shaft.

2. A dishwashing machine comprising a tub, a dish-supporting rack movably mounted in the tub, means for elevating said rack from a lower to a higher position in the tub, said means comprising a rotatable threaded shaft projecting upwardly into the tub, a nut in constant threaded engagement with said shaft and disposed below said rack to raise and lower the same upon rotation of said shaft, means on said rack adapted to be non-rotatably engaged with said nut to prevent rotation of the latter with the shaft, and means to arrest movement of the rack at predetermined limits of the movement thereof.

3. A dishwashing machine comprising a tub, a dish-supporting rack movably mounted in the tub, means for elevating said rack from a lower to a higher position in the tub, said means comprising a rotatable threaded shaft projecting upwardly into the tub, a nut disposed below the rack and threadedly engaged with said shaft to be raised and lowered when the latter is rotated in reverse directions, and a member carried by the rack and engageable with said nut to effect movement of the rack.

4. A dishwashing machine comprising a tub, a dish-supporting rack movably mounted in the tub, means for elevating said rack from a lower to a higher position in the tub, said means comprising a rotatable threaded shaft projecting upwardly into the tub, a reversible motor for rotating said shaft, a nut disposed below the rack and threadedly engaged with said shaft, a rack-supporting grid within the tub below the rack, and a sleeve member secured to said grid and having means to non-rotatably engage said nut.

5. A dishwashing machine comprising a tub, a dish-supporting rack movably mounted in the tub, means for elevating said rack from a lower to a higher position in the tub, said means comprising a rotatable threaded member projecting upwardly into the tub, a reversible motor for rotating said member, a nut threadedly engaged with said member, a rack-supporting grid within the tub below the rack, and a sleeve member secured to said grid and engageable by the nut, said nut and sleeve member having cooperating clutch faces thereon to prevent relative rotation of said members when said elements are in engagement.

6. A dishwashing machine comprising a tub, a dish-supporting rack movably mounted in the tub, means for elevating said rack from a lower to a higher position in the tub, said means comprising a rotatable threaded member projecting upwardly into the tub, a reversible motor for rotating said member, a nut threadedly engaged with said member, a rack-supporting grid within the tub below the rack, and a sleeve member secured to said grid and engageable by the nut, said grid being flexible whereby it may be flexed downwardly to engage said nut and sleeve member.

7. A dishwashing machine comprising a tub, a dish rack supported in the tub, said rack comprising a pair of foldable portions one of which is pivotally connected to the tub, a plurality of upstanding members on one of said portions between which articles may be supported, and a similar member of lesser height on the other of said portions.

8. A dishwashing machine comprising a tub, a dish-supporting rack movably mounted in the tub, means for elevating and lowering said rack within the tub, a reversible motor for operating said means, a second dish-supporting rack above the first, said rack comprising foldable portions, and means to effect the folding of said portions when the first-named rack is elevated.

9. A dishwashing machine comprising a tub, a dish rack supported in the tub, said rack comprising a section having an upstanding dish-supporting member thereon pivoted to the tub at its outer edge to swing from a substantially horizontal position to a substantially vertical position, a second section, also having an upstanding dish-supporting member thereon hinged to the inner edge of the first section whereby it may be folded against said first section with said members projecting outwardly from the respective sections in opposite directions, and means for supporting said sections in a substantially horizontal position in extended relation.

10. A dishwashing machine comprising a tub, a dish rack supported in the tub, said rack being hinged to the tub adjacent one edge thereof to swing from a substantially horizontal position to a substantially vertical position, and said rack being articulated adjacent its central portion whereby the articulated parts thereof may fold together, each of said parts having an upstanding dish-supporting member thereon, and means for supporting said rack in a substantially horizontal position with said upstanding members in a substantially vertical position.

11. A dishwashing machine comprising a tub, a pair of dish racks suitably supported in the tub, each of said racks having upstanding dish-supporting members thereon and extending from a point adjacent the center of the tub to points adjacent the side walls thereof, and each of said racks being hinged to the tub adjacent one edge thereof to swing from a substantially horizontal position to a substantially vertical position and being articulated adjacent its central portion whereby the articulated parts may fold together with the upstanding members extending outwardly from the respective rack parts in opposite directions.

12. A dishwashing machine comprising a tub, a dish rack supported in the tub comprising a pair of foldable sections, an upstanding dish-supporting member on the upper face of each of said sections, one of said sections being pivoted to the tub adjacent its outer edge, and the other section being pivoted to an opposite edge of the first section, said last-named pivotal connection being adapted to permit said connections to fold together back to back with the upstanding member on one section projecting in a direction opposite to that of the member on the other section.

13. A dishwashing machine comprising a tub, a dish rack supported in the tub comprising a pair of foldable sections pivoted together at their adjacent edges to permit said sections to fold together with their lower faces in juxtaposition, one of said sections being pivoted to the tub adjacent its outer edge whereby both sections may be folded to an upright position adjacent the tub wall, an upstanding dish-supporting member on the upper face of each of said sections, and means for supporting said sections in the tub in substantially horizontal position.

LAWRENCE A. LOEB.